R. ROWLEY.
TIRE SHOE WRAPPING AND VULCANIZING APPARATUS.
APPLICATION FILED APR. 6, 1910.
979,568.
Patented Dec. 27, 1910.
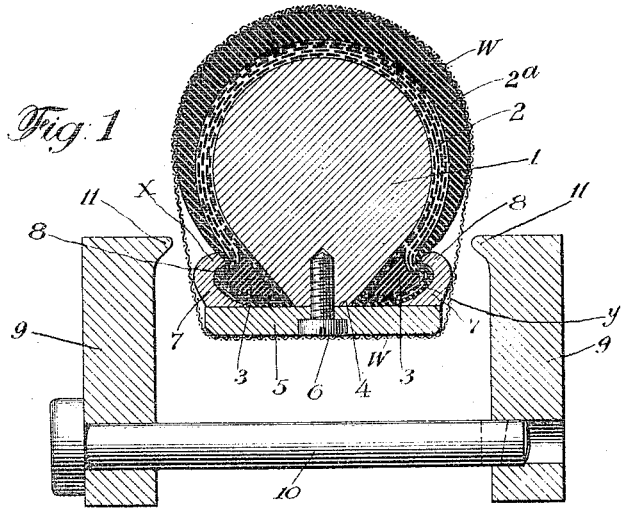
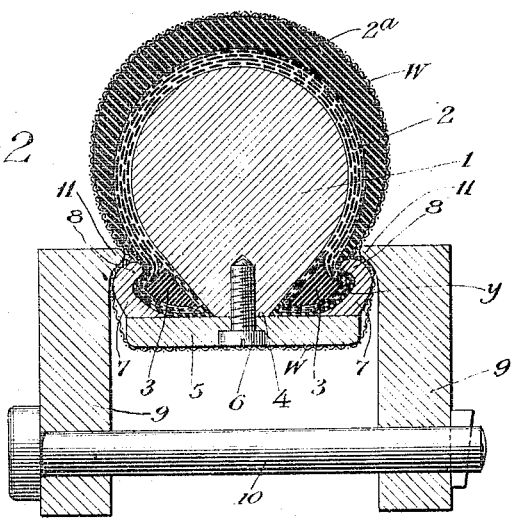
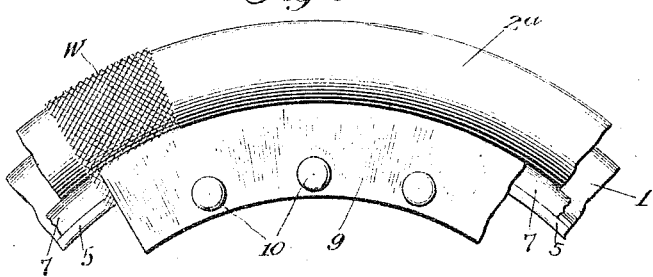
Witnesses:
Inventor
Robert Rowley,
By his Attorney

UNITED STATES PATENT OFFICE.

ROBERT ROWLEY, OF NEW YORK, N. Y.

TIRE-SHOE WRAPPING AND VULCANIZING APPARATUS.

979,568.                    Specification of Letters Patent.    Patented Dec. 27, 1910.

Application filed April 6, 1910. Serial No. 553,862.

*To all whom it may concern:*

Be it known that I, ROBERT ROWLEY, citizen of the United States, residing at New York city, in the county of New York and State of New York, have invented certain new and useful Improvements in Tire-Shoe Wrapping and Vulcanizing Apparatus, of which the following is a specification, reference being had therein to the accompanying drawings.

This invention relates to apparatus for use in wrapping tire shoes of clencher-bead or other type prior to, and holding them wrapped during, vulcanization by the open cure process.

The object of the invention is to produce a new form of apparatus which is convenient for assemblage with the mandrel, shoe carcass and wrapping, and which is better adapted than analogous prior apparatus for shaping the clencher-beads or otherwise shaped margins of the shoe during the wrapping and vulcanizing operations.

In the accompanying drawings, Figure 1 is a transverse, sectional view, at line 1—1 of Fig. 3, of an assembled shoe carcass having embedded clencher bead rings; annular mandrel; inner detachable ring of the mandrel; a pair of annular bead or shoe margin-shaping rings; wrapping, and wrapping-compression plates in their initial wrapping-compression position. Fig. 2 is a view similar to Fig. 1, but shows the parts in final position, after the wrapping is in place, for inward wrapping-compression movement of the annularly lipped sideplates. Fig. 3 is a side elevation of what is shown in Fig. 1.

In the drawings, 1 is an annular mandrel on which the shoe carcass 2 is circumferentially mounted and circumferentially inclosed in the usual vulcanizable rubber tread 2ª. Generally, the carcass is built up on the mandrel out of strips of friction fabric circumferentially applied one over the other; straight strips of vulcanizable rubber being bent ring-wise along each marginal portion of the shoe carcass, during its construction, to form the vulcanizable rubber clencher-head rings 3 which are embedded in the carcass. These bead rings 3 adhere in place, and while in their pre-vulcanized state are of approximately the cross-sectional shape they are to be after vulcanization; but, nevertheless, it is important not to deform either the soft bead rings or their encasement (the bead rings and their encasement forming the shoe beads) during the wrapping-compression operation. It is also important to secure these vulcanizable shoe beads, and to pre-perfect the shape which they are to receive during vulcanization and which they are to have in subsequent use. As the shoe beads, when in use, are clamped in a wheel rim, it is important that they be compacted and perfectly shaped prior to and during vulcanization. To secure this important result with a maximum of convenience and certainty, I prefer to make the inner periphery of the mandrel flat, as at 4, to engage snugly with the sidewise movable mandrel ring 5, the margins of which project laterally at each side of the inner periphery of the mandrel. The mandrel ring 5 is sidewise and slidably movable within the annular mandrel to facilitate its assemblage with the mandrel. This ring 5 is readily and cheaply made with a flat outer periphery, and is best bolted at 6, midway between its edges, to the inner flat peripheral wall of the mandrel, midway between the mandrel sides, whereby its laterally projecting margins, in connection with the sloping sides of the mandrel, form annular spaces in which the shoe beads are contained. The outer, flat peripheral faces of the laterally projecting margins of the mandrel ring form bearings on which the two bead or margin-shaping rings 7 are mounted so as to slide sidewise, the inner surfaces of these bead-shaping rings being of a contour corresponding to the outward wall of the clencher-beads 8 of the shoe.

When the parts aforesaid are initially assembled, the temporary wrapping W, usually of wet strips of fabric, is wound spirally and tightly around the exposed portion of the shoe and also around the margin or bead-shaping rings 7 and the mandrel ring 5, and through the latter, the wrapping extending tangentially on each side of the shoe, from a point well toward the tread to the edges of the mandrel ring. Thus on each side of the shoe and circumferentially around each side, the tightly wound wrapping is out of contact with the shoe carcass, from a point well toward the tread inwardly. When the wrapping is initially in place, the wrapping-compression rings 9, one on one side and the other on the other side of the mandrel, are assembled with their transverse-holding pins 10 and with their inwardly projecting, an nular lips 11 against the wrapping opposite the marginal portions of the shoe carcass, just outwardly of the outer peripheries of the laterally slidable shaping-rings 7. The "side-plates," as they are commonly called, or wrapping-compression rings 9, are then forced together to strain the wrapping over and against the tread and side walls of the carcass. In their inward movement, the side-plates move the bead rings 7 farther inwardly, causing their upper lips x to move into the clencher grooves and shape them, while the lips 11 are straining the wrapping over and against the tread and sides of the carcass. The lower concave faces y of rings 7 are pressed against the lateral walls of the shoe beads, and, consequently, the inward movement of the rings 7 compresses and shapes and holds in shape the clencher-groove and outer surfaces of the beads, the margins of the shoe being thus forced into the annular and somewhat angular space between each lateral margin of the mandrel ring and the adjacent sloping side of the mandrel. The shoe, enormously compacted from bead to bead, is secured, and the wrapping held in place from bead to bead during open cure vulcanization.

The annular, inwardly projecting lips 11 of the compression-rings 9 are of an interior diameter slightly greater than the outer diameter of the rings 7, so as to move inwardly past rings 7 during the compression movement, and these lips 11 are deeper or longer than the lateral projection of the mandrel ring on each side of the inner periphery of the mandrel,—sufficiently longer to prevent the body portions 13 of the side-plates coming in contact with the opposite edges of the mandrel ring during the inward movement, so that the lips 11 and also the rings 7 can be forced inwardly against the somewhat elastic, though highly compacted, carcass, as far as the carcass itself will resiliently permit. In this way, maximum compactness of the shoe beads is secured. The slidable bead-shaping rings 7, having circumferentially extending, transversely concave faces corresponding to the exterior contour of the shoe beads, in clencher tires, are initially slid inward when the wrapping is wound in place. The final inward movement, due to the inward compressive movement of the side-plates on the wrapping, effects the final inward movement of the rings 7, and they also are forced home as far as the carcass will resiliently permit. The side-plates are usually moved inward by compression in a hydraulic or other powerful press.

If the margins of the shoe are not to be of clencher-bead formation, the inward faces of the slidable bead-shaping rings may be of other suitable contour, together with the cross-sectional contour of the mandrel, without departure from this invention; for example, as in the case of a "mechanically fastened" tire. Therefore, the bead-shaping rings 7, specifically adapted for clencher-bead shoes, and pictorially illustrated, are, within the broader scope of my invention, to be considered as shoe margin-shaping rings.

What I claim is:—

1. In tire-wrapping apparatus, the combination of an annular mandrel; an inner, laterally projecting mandrel ring; a pair of shoe margin shaping-rings, each slidably mounted on a projecting margin of the mandrel ring; and a pair of wrapping-compression-plates having inward annular lips, the inner diameters of which are greater than the outer diameters of the shoe margin shaping-rings.

2. In tire-wrapping apparatus, the combination of an annular mandrel; an inner, laterally projecting mandrel ring; a pair of shoe margin shaping-rings, each slidably mounted on a projecting margin of the mandrel ring; a wrapping tubularly inclosing the mandrel, and a shoe when in place, together with the mandrel ring and bead margin shaping-rings; a pair of wrapping-compression-plates having inward annular lips, the inner diameters of which are greater than the outer diameters of the margin shaping-rings; and means for holding said wrapping-compression-plates in laterally movable relation one to another and to the mandrel.

3. In tire-wrapping apparatus, the combination of an annular mandrel; an inner, laterally projecting mandrel ring, the outer periphery of which is in contact with the inner periphery of the mandrel; a pair of clencher bead shaping-rings, each slidably mounted on a projecting margin of the mandrel ring, and having an inner, circumferentially extending, transverse, concave surface; a wrapping tubularly inclosing, when a shoe is in place, the shoe, mandrel, mandrel ring and bead shaping-rings; a pair of wrapping-compression plates having inward, annular lips, the inner diameters of which are greater than the outer diameters of the bead shaping-rings; and means for holding said wrapping-compression plates in laterally movable relations one to another.

In testimony whereof I have affixed my signature in presence of two witnesses.

ROBERT ROWLEY.

Witnesses:
E. S. BEACH,
F. E. NARES.